US006869025B2

(12) United States Patent
Guesdon

(10) Patent No.: US 6,869,025 B2
(45) Date of Patent: Mar. 22, 2005

(54) CHASSIS FOR AN AGRICULTURAL SPRAYER

(75) Inventor: Alain Guesdon, Noisy sur Ecole (FR)

(73) Assignee: Kuhn-Nodet S.A., Montereau (FR)

( * ) Notice: Subject to any disclaimer, the term of this patent is extended or adjusted under 35 U.S.C. 154(b) by 361 days.

(21) Appl. No.: 10/050,961

(22) Filed: Jan. 22, 2002

(65) Prior Publication Data

US 2002/0104897 A1 Aug. 8, 2002

(30) Foreign Application Priority Data

Feb. 7, 2001 (FR) .............................................. 01 01613

(51) Int. Cl.[7] .......................... A01G 25/09; E01C 19/16; E01H 3/02; B05B 1/20; A01B 49/00
(52) U.S. Cl. .......................... 239/172; 239/159; 172/311
(58) Field of Search ................................ 239/172, 159, 239/147, 146; 172/311, 452, 456, 272, 274; 280/477, 489

(56) References Cited

U.S. PATENT DOCUMENTS

| | | | | |
|---|---|---|---|---|
| 1,471,548 A | * | 10/1923 | Clement | 280/475 |
| 3,792,814 A | | 2/1974 | Platz | |
| 3,921,907 A | * | 11/1975 | Anderson | 239/172 |
| 4,602,742 A | | 7/1986 | Penson | |
| 5,375,767 A | * | 12/1994 | Thorstensson | 239/164 |
| 6,209,895 B1 | * | 4/2001 | Mueller et al. | 280/124.116 |
| 6,315,218 B1 | | 11/2001 | Guesdon | |
| 6,343,661 B1 | * | 2/2002 | Thompson et al. | 172/444 |

FOREIGN PATENT DOCUMENTS

FR 2 560 534 9/1985

OTHER PUBLICATIONS

U.S. Appl. No. 09/808,168, filed Mar. 15, 2001, Pending.
U.S. Appl. No. 09/899,154, filed Jul. 6, 2001, Pending.
U.S. Appl. No. 09/948,578, filed Sep. 10, 2001, Pending.
U.S. Appl. No. 10/050,961, filed Jan. 22, 2002, Pending.
U.S. Appl. No. 10/050,961, filed Jan. 22, 2002, Guesdon.
U.S. Appl. No. 10/325,938, filed Dec. 23, 2002, Guesdon et al.
U.S. Appl. No. 10/051,041, filed Jan. 22, 2002, Pending.
U.S. Appl. No. 10/050,957, filed Jan. 22, 2002, Pending.

* cited by examiner

*Primary Examiner*—David A. Scherbel
*Assistant Examiner*—Darren Gorman
(74) *Attorney, Agent, or Firm*—Oblon, Spivak, McClelland, Maier & Neustadt, P.C.

(57) ABSTRACT

The present invention relates to an agricultural sprayer the chassis of which comprises a bearing structure intended to support a storage device and a connecting structure intended to support a spreading device. The sprayer is notable in that the bearing structure comprises a single stringer. The present invention advantageously reduces the cost of manufacture of the sprayer.

17 Claims, 3 Drawing Sheets

CHASSIS FOR AN AGRICULTURAL SPRAYER

BACKGROUND OF THE INVENTION

1. Field of the Invention

The present invention relates to the general technical field of agricultural machinery and more specifically to a sprayer the chassis of which comprises a bearing structure intended to support a storage device and a connecting structure intended to support a spreading device.

2. Discussion of the Background

Such a chassis is known to those skilled in the art. Indeed, document FR 2 520 586 describes an agricultural sprayer the chassis of which is intended to support a tank for plant protection product. To do this, said chassis comprises a frame arranged in a substantially horizontal plane. This frame is made, in an entirely typical way, using two stringers connected to one another by crossbeams. This known chassis also comprises two uprights intended to support a spray boom. Said uprights, welded to the rear of a respective stringer, are arranged vertically.

This known chassis does, however, have the drawback of being relatively lengthy and expensive to manufacture. Indeed, to obtain the frame and the connecting structure, it is necessary first of all to fashion a relatively large number of elements (stringers, crossbeams, uprights, etc). These various elements then have to be assembled with particular care in order to guarantee that it will be easy to mount said storage device and said spreading device on said chassis.

SUMMARY OF THE INVENTION

The object of the present invention consists in overcoming this drawback of the state of the art by proposing a sprayer of simplified design and which is less expensive to manufacture.

To this end, the sprayer of the present invention is one wherein said bearing structure comprises a single stringer. The manufacture of such a bearing structure therefore entails the production of just one element. Said chassis is therefore much less expensive and time-consuming to manufacture.

According to another feature of the present invention, said connecting structure advantageously comprises a single upright. This makes it possible to reduce the cost of manufacture of said chassis even further.

According to an additional feature of the present invention, said chassis rests at least partially on the ground by means of a ground-connection device. As a preference, said ground-connection device comprises a suspension intended to damp the jolts caused by the movement of said sprayer over uneven terrain. To this end, said suspension comprises an active element comprising an elastically deformable member and a damper. Still with a view to reducing the cost of manufacture, said active element advantageously requires just one anchoring point on said chassis.

Sprayers of the trailed type comprise a hitching head intended to connect said chassis to a tractor vehicle. During maneuvers, said tractor vehicle and said sprayer are articulated, in a way known to those skilled in the art, about a vertical axis passing through said hitching head. Relatively large angular travel about said vertical axis guarantees good manoeuvrability. To this end, it is known practice in the state of the art for said hitching head to be connected to said chassis by means of a hitching boom. Said hitching boom advantageously allows the relatively wide elements of said sprayer (chassis, tank) to be kept away from the area in which, during said pivoting, the rear wheel of said tractor vehicle in particular moves. According to another feature of the present invention, said hitching device advantageously comprises a hitching head connected directly to said chassis. The sprayer of the present invention thus saves on said hitching boom.

BRIEF DESCRIPTION OF THE DRAWINGS

Other features of the invention, which are to be considered separately or in any possible combination, will become further apparent from the following description of one non limiting exemplary embodiment of the invention which is depicted in the appended drawings in which.

DESCRIPTION OF THE PREFERRED EMBODIMENT

Figure 1:
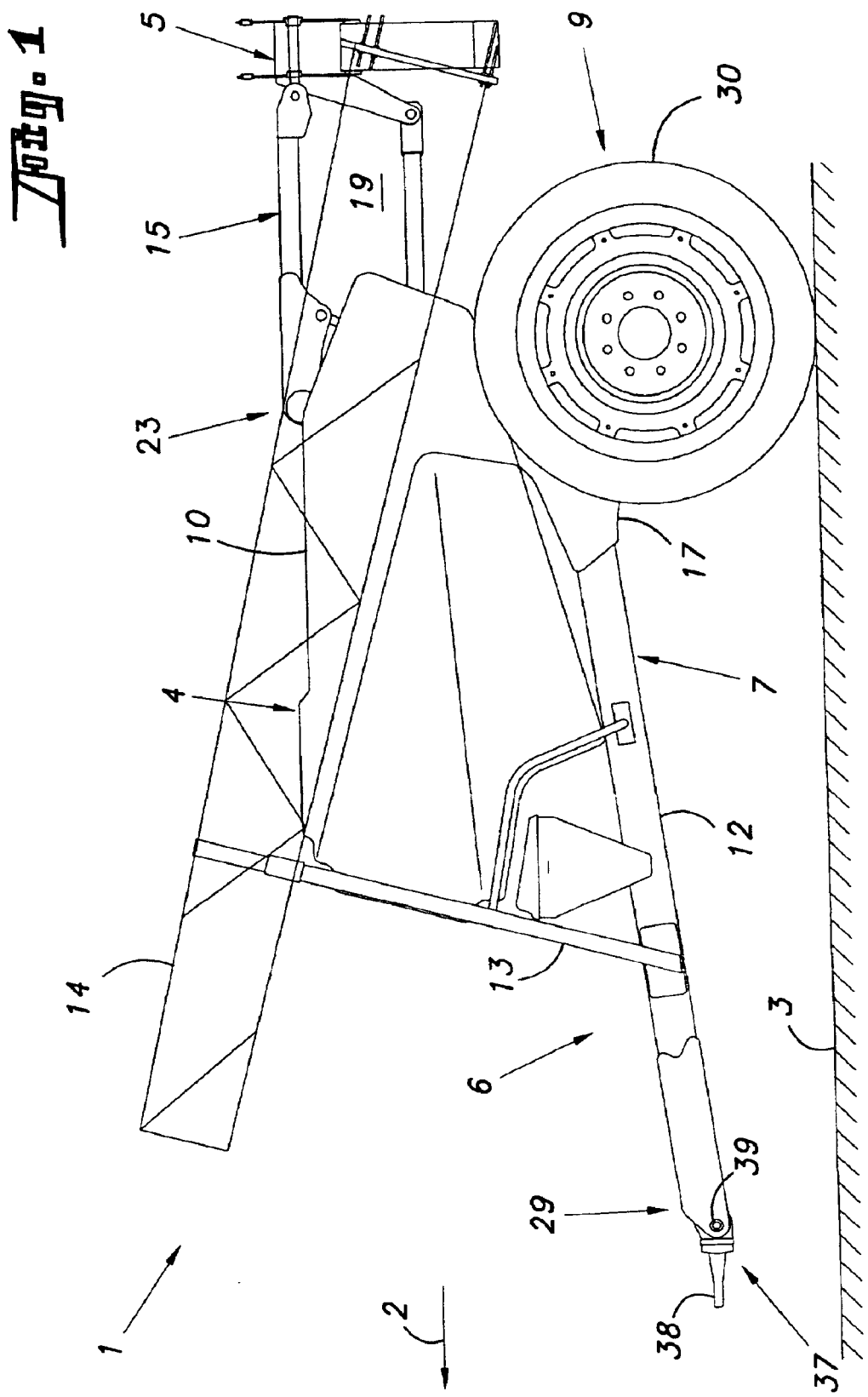
FIG. 1 depicts, in a side view, an agricultural sprayer according to the invention.

FIG. 1 depicts, in a side view, an agricultural sprayer 1 according to the present invention. During work or during transport, said sprayer 1 is moved along in a direction and sense of travel indicated by the arrow 2. In the remainder of the description, the ideas of "forward" and "back", "in front of" and "behind" are defined with respect to the direction of forward travel 2, and the ideas of "right" and "left" are defined when looking at said sprayer 1 from the rear in the direction of forward travel 2.

In a way known to those skilled in the art, said sprayer 1 is used to spread a treatment liquid, for example a fertilizer or a plant protection product, over plants and/or over the ground 3. To this end, said sprayer 1 comprises a storage device 4 intended to contain, among other things, said treatment product. Said sprayer 1 additionally comprises a spreading device 5 intended to spread said product substantially uniformly over a working width. Said storage device 4 and said spreading device 5 are supported by a chassis 6. To do this, said chassis 6 comprises respectively a bearing structure 7 and a connecting structure 8. In the case of sprayers of the mounted type, said chassis 6 is designed to be supported by the three-point hitch of a carrier vehicle (not depicted). By contrast, in the case of trailed or self-propelled sprayers, said chassis 6 rests at least partially on the ground 3 by means of a ground-connection device 9.

Figure 2:
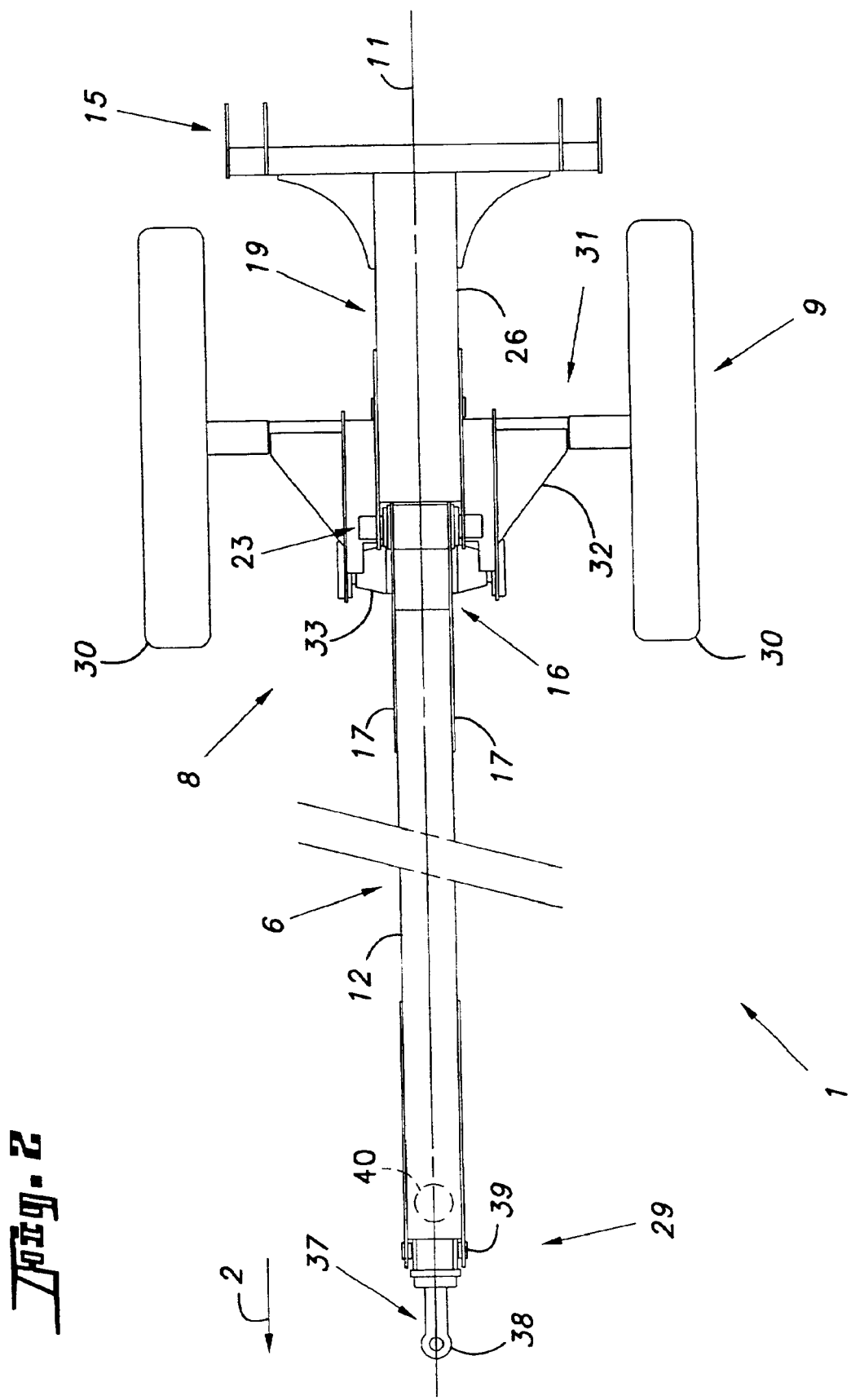
FIG. 2 depicts, in a view from above and on a different scale, the chassis of the sprayer of FIG. 1.

In the exemplary embodiment depicted in FIG. 1, said storage device 4 comprises a main tank 10 intended to contain said treatment liquid. Said main tank 10 is advantageously arranged on each side of a vertical mid-plane 11 of said sprayer 1. For purposes of clarity, said main tank 10 has not been depicted in FIGS. 2 and 3.

Figure 3:
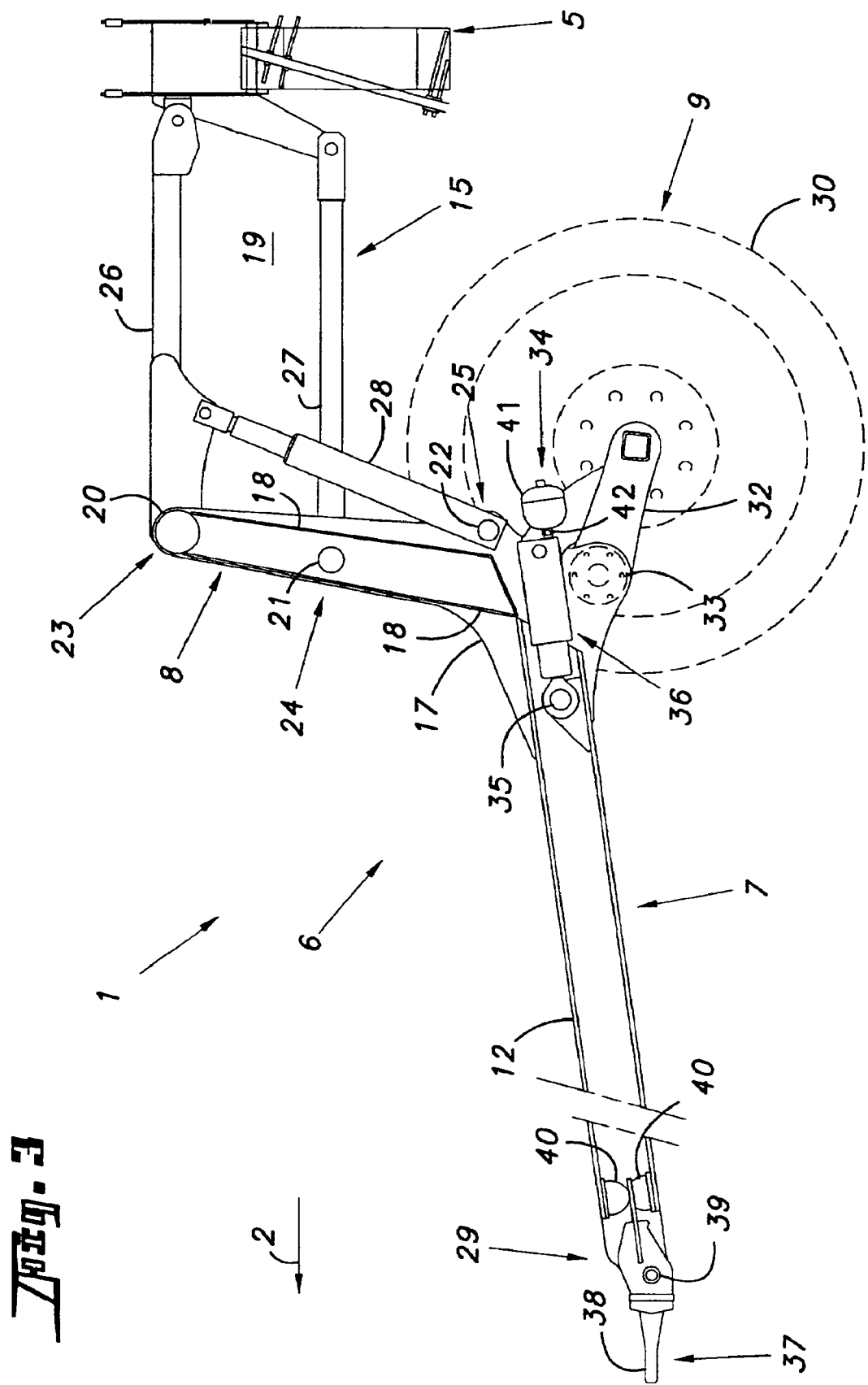
FIG. 3 depicts, in a side view and with part sections and on another scale, the chassis of FIG. 2.

According to an important feature of the present invention, said tank 10 is supported by a single stringer 12. As a preference, said stringer 12 is arranged under said tank 10 and at least substantially in said vertical mid-plane 11. In the light of FIG. 3, said stringer 12 is advantageously made using a substantially straight hollow section piece. Said section piece, a tube of square cross section in the example depicted, makes it possible to obtain a bearing structure 7 which is robust and relatively lightweight while at the same time being inexpensive to manufacture.

In a way known to those skilled in the art, said chassis 6 also comprises a superstructure 13 intended, among other things, to hold said tank 10 on said stringer 12. According to another exemplary embodiment, not depicted, said storage device 4 may also comprise one or more secondary tanks intended, for example, to contain a rinsing liquid. Said secondary tanks are supported either directly by said stringer 12 or via said superstructure 13. In any event, as said superstructure 13 is connected to said stringer 12, all of the weight of said storage device 4 rests on said stringer 12. As it is known to those skilled in the art and for reasons of clarity, said superstructure 13 has not been depicted in FIGS. 2 and 3.

For its part, said spreading device 5 comprises, in the exemplary embodiment visible in the figures, a boom 14 supporting a multiplicity of spray nozzles (not depicted). During work, said boom 14 is deployed, transversely to said direction of forward travel 2, on each side of said sprayer 1. Said nozzles are intended to spray said treatment liquid uniformly over the plants and/or over the ground 3. During transport, as depicted in FIG. 1, said boom 14 is advantageously folded so as to reduce the size of said sprayer 1. As a preference, during transport, said boom 14 rests at least partially on said superstructure 13. As said boom 14 is known per se, it has been depicted only in FIG. 1 and then symbolically.

In a way known to those skilled in the art, said spreading device 5 also comprises a connecting member 15 intended to connect said boom 14 to said chassis 6. During work, said connecting member 15 has, in particular, to keep said boom 14 parallel to said ground 3. Advantageously, said connecting member 15 also makes it possible, for example according to the size of the plants that are to be treated, to alter the distance separating said spray nozzles from said ground 3. In the exemplary embodiment depicted in the figures, this modification of the spraying height is achieved by means of a deformable-parallelogram system.

According to another feature of the present invention, said connecting member 15 is connected to a single upright 16 of said chassis 6. As a preference, said upright 16 lies at least substantially in said vertical mid-plane 11 and at the rear of said sprayer 1. As can be seen in FIG. 3 which depicts a view in section of said chassis 6, said upright 16 is made using two substantially vertical side plates 17 connected by two closure sheets 18. Said upright 16 thus has a box structure perfectly suited to withstanding the stresses generated by said spreading device 5.

In the exemplary embodiment depicted in the figures, said system with a parallelogram advantageously comprises a single parallelogram 19. In FIG. 3, said upright 16 has three openings 20, 21, 22 defining the respective axes of three articulations 23, 24, 25. Said articulations 23, 24 respectively allow the connecting of an upper arm 26 and of a bottom arm 27 of said parallelogram 19 to said upright 16. For its part, said articulation 25 allows a ram 28 to be connected to said upright 16. In a way known to those skilled in the art, said ram 28 is intended to deform said parallelogram 19 and thus move said boom 14 in a substantially vertical direction.

In the exemplary embodiment depicted in the figures, said sprayer 1 is of the trailed type. Said chassis 6 therefore rests at least partially on the ground 3 by means of said ground-connection device 9. In addition, said chassis 6 is connected to a tractor vehicle (not depicted) by means of a hitching device 29.

In a way known to those skilled in the art, said ground-connection device 9 comprises at least two wheels 30 arranged one on each side of said vertical mid-plane 11. In a particularly advantageous way, said wheels 30 are connected to said chassis 6 by means of a suspension 31 making it possible to damp out jolts generated by the movement of said sprayer 1 over uneven terrain.

In the exemplary embodiment depicted in the figures, said suspension 31 comprises a trailed arm 32 connected to said chassis 6 by means of an articulation 33 the axis of which is at least substantially horizontal and perpendicular to said direction of forward travel 2. Said articulation 33 is advantageously arranged in said vertical mid-plane 11. As a preference, said trailed arm 32 is connected to said side plates 17. As visible in particular in FIG. 3, said suspension 31 also comprises an active element 34 making it possible to damp the pivoting of said trailed arm 32 relative to said chassis 6 about said articulation 33. In a way known to those skilled in the art, said active element 34 comprises an elastically deformable member and a damper.

According to another feature of the present invention, said active element 34 requires just one anchoring point 35 on said chassis 6.

In effect, in the exemplary embodiment depicted more specifically in FIG. 3, said active element 34 is made of a single oleopneumatic ram 36 connected, on one hand, to said chassis 6 and, on another hand, to said trailed arm 32. In a particularly advantageous way, said anchoring point 35 of said oleopneumatic ram 36 to said chassis 6 lies inside said stringer 12. Said oleopneumatic ram 36 comprises an adjustable energy accumulator 41 and an adjustable restriction 42. Thus, the stiffness and damping of said suspension 31 can easily be adapted to suit the weight of said sprayer 1. As said oleopneumatic ram 36 is known per se, it will not be described further.

For its part, and in a way known to those skilled in the art, said hitching device 29 comprises a hitching head 37. In the exemplary embodiment depicted in the figures, said hitching head 37 is produced by means of a ring 38 intended to fit into a hook (not depicted) of said tractor vehicle.

According to another feature of the present invention, said hitching head 37 is connected directly to said chassis 6 and more specifically to said stringer 12.

Being relatively narrow and arranged in said vertical mid-plane 11, said stringer 12 also fulfils the function devolved upon the hitching booms of the prior art, namely that of allowing a relatively large amount of angular travel between said tractor vehicle and said sprayer 1. As a preference, said hitching head 37 is connected to said stringer 12 by means of an articulation 39 the axis of which is substantially horizontal and perpendicular to said direction of forward travel 2. Advantageously, the pivoting of said hitching head 37 with respect to said stringer 12 about said articulation 39 is damped by means of damping elements 40. Said damping elements 40 are advantageously arranged inside said stringer 12.

The chassis 6 and the agricultural sprayer 1 which have just been described are just one exemplary embodiment and example of use which must not in any way be taken as limiting the field of protection defined by the claims which follow.

Thus, the mechanism for moving said boom 14 closer to or further away from said ground 3 may also be produced by means of a sliding connection of substantially vertical axis.

In addition, said hitching head 37 may have a totally different design to the one depicted. Specifically, it may be produced using a cradle intended to be connected to the lower arms (not depicted) of a three-point hitch of said tractor vehicle.

What is claimed as new and desired to be secured by Letters Patent of the United States is:

1. An agricultural sprayer equipped with a chassis, said chassis comprising:

a bearing structure supporting a storage device, and a connecting structure supporting a spreading device, wherein said bearing structure comprises a single stringer, said connecting structure comprises a single upright arranged in a vertical mid-plane of said sprayer, and said upright is connected to a system of said spreading device, said system comprising a parallelogram.

2. Agricultural sprayer as claimed in claim 1, wherein said stringer is arranged in a vertical mid-plane of said sprayer.

3. Agricultural sprayer as claimed in claim 1, wherein said stringer is straight.

4. Agricultural sprayer as claimed in claim 1, wherein said stringer is made using a hollow section piece.

5. Agricultural sprayer as claimed in claim 1, wherein said upright is directed in a vertical direction.

6. Agricultural sprayer as claimed in claim 1, wherein said chassis rests on the ground by a ground-connection device.

7. Agricultural sprayer as claimed in claim 6, wherein said ground-connection device comprises a trailed arm connected to said chassis by an articulation.

8. Agricultural sprayer as claimed in claim 7, wherein said articulation is arranged in a vertical mid-plane of said sprayer.

9. Agricultural sprayer as claimed in claim 6, wherein said ground-connection device comprises an active element entailing just one anchoring point on said chassis.

10. Agricultural sprayer as claimed in claim 9, wherein said anchoring point lies inside said stringer.

11. Agricultural sprayer as claimed in claim 9, wherein said active element is an oleopneumatic ram.

12. Agricultural sprayer as claimed in claim 1, wherein said chassis is connected to a tractor vehicle by a hitching device comprising a hitching head.

13. Agricultural sprayer as claimed in claim 12, wherein said hitching head is connected directly to said stringer.

14. Agricultural sprayer as claimed in claim 13, wherein said bitching head is connected to said stringer by an articulation.

15. Agricultural sprayer as claimed in claim 14, wherein a pivoting of said hitching head with respect to said stringer about said articulation is damped using damping elements.

16. Agricultural sprayer as claimed in claim 15, wherein said damping elements are arranged inside said stringer.

17. An agricultural sprayer equipped with a chassis, said chassis, comprising:

a bearing structure supporting a storage device, and a connecting structure supporting a spreading device, wherein said bearing structure comprises a single stringer, said chassis rests on the ground by a ground-connection device, said ground-connection device comprises an active element entailing just one anchoring point on said chassis, said active element is an oleopneumatic ram, and said oleopneumatic ram is arranged in a vertical mid-plane of said sprayer.

* * * * *